Oct. 27, 1925.
R. J. HEITZMAN
VARIABLE TRANSFORMER
Filed June 28, 1922
1,559,166
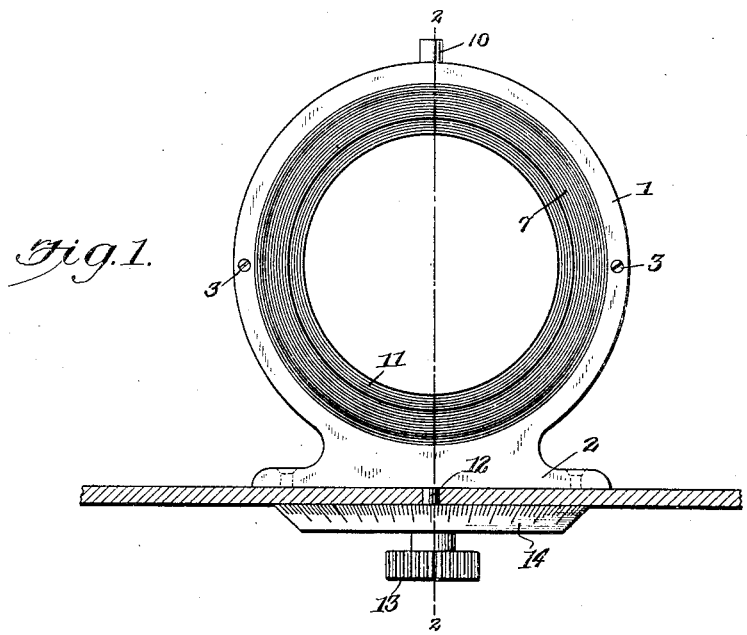
Fig. 1.
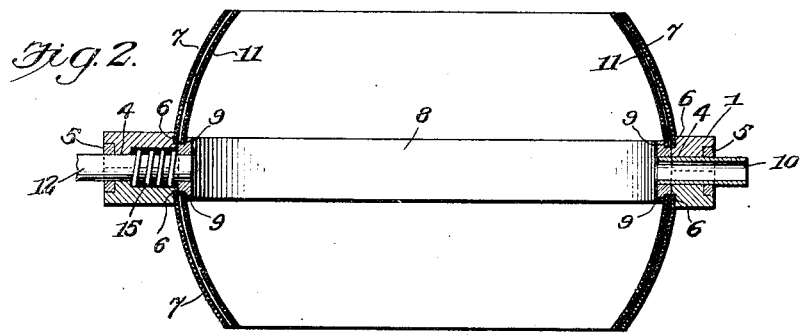
Fig. 2.
Fig. 3.
Fig. 4.
INVENTOR.
R. J. Heitzman,
BY
ATTORNEY.

Patented Oct. 27, 1925.

1,559,166

UNITED STATES PATENT OFFICE.

ROBERT J. HEITZMAN, OF UNION HILL, NEW JERSEY.

VARIABLE TRANSFORMER.

Application filed June 28, 1922. Serial No. 571,450.

*To all whom it may concern:*

Be it known that I, ROBERT J. HEITZMAN, a citizen of the United States, residing at Union Hill, in the county of Hudson, State of New Jersey, have invented certain new and useful Improvements in Variable Transformers; and I do hereby declare the following to be a full, clear, and exact description of the invention, such as will enable others skilled in the art to which it appertains to make and use the same.

The invention relates to variable electric transformers, and more particularly, to so-called variometers and vario-couplers such as employed in the circuits of radio telegraphy and telephony apparatus; and has for its object to provide an apparatus of the character described comprising a stator coil and a concentric rotor coil, each comprising one or more layers of wire, and so cemented together as to form a self-sustaining shell having the contour of a truncated sphere, the mid-sections being supported by two simple rings or annuli, the rotor ring being journalled within the stator ring or support so that the rotor is revoluble within the stator, and the adjacent windings of the rotor and stator are separated by a very narrow air-gap, which greatly increases the delicacy of the apparatus throughout the various ranges of adjustment thereof, and admirably adapts the same to the purposes of radio telegraphy and telephony. A simple and preferred form of the apparatus is illustrated in the accompanying drawings, in which, Fig. 1 is a plan view of a variometer as applied to a suitable support;

Fig. 2 is a section on line 2—2 of Fig. 1;

Fig. 3 is an enlarged side elevation with portions of the coil broken away;

Fig. 4 is a similar view illustrating the stator coil constructed as a vario-coupler element.

Referring to the drawings, 1, 1, indicate two halves of a ring-like element or support for the stator coil, having base or foot portions 2, 2, by means of which the support may be secured to the side of a box or cabinet or other sustaining element. The two halves 1, 1, of the ring are adapted to be connected together by any suitable means, such, for example, as screws 3, 3, and each half-ring is provided with diametrically disposed grooves 4, 4, which, when the half-ring sections are secured together, form journal bearings, the outer portions of which may be provided with bushings 5, 5, to take up wear. The inner face of each half-ring section is provided with an annular shoulder 6, which constitutes the base or support for the first two or three convolutions of an initial layer of wire of the stator coil.

It will be apparent that the stator coil may comprise either a single layer of wire, divided into two sections and supported by the respective ring sections 1, 1, or, if desired, it may comprise several superposed layers. In the better types of variometers and vario-couplers, it has been customary to wind the coils of the rotor and stator elements on relatively large cores, the rotor core being in the form of a sphere of wood or the like having two sections cut off at right angles to the axis of rotation, and the stator core comprising either a cylinder or a frame within which the stator coils were wound, in each instance the coils being supported throughout by the subjacent or superposed cores or supports. As a result of this form of application, the space between the respective coils of the stator and rotor elements is quite wide, which prevents the use of a narrow air-gap between the coils with a consequent loss of power and capability of fine adjustment of the inductance between the respective portions of the circuits including the two coils. According to the present invention, the coils are so constructed and arranged that the adjacent layers of the coils, when a single layer only is employed in each, and the initial layers, when more than one layer is employed, are separated by a very narrow air-gap, so that the maximum inductance between the coils may be attained, with a minimum loss of energy in the transformer, due to the air-gap, and the successive variations of the inductance are accordingly very small, so that the apparatus is adapted to particularly fine adjustments.

The method of constructing each of the coils is similar, and that as applied to the stator coil will now be described.

A core of wood or the like in the form of the segment of a sphere is provided to fit accurately within one of the ring sections 1, and one section of the coil 7 of the stator element is wound helically on the surface of the core, the initial turns or convolutions of the coil being seated on the annular shoulder 6 of the ring, the several convolutions of the coil being laid in contact and the winding continued until the correct number of turns desired is laid up. If a single layer only is desired, when said layers has been completed, a suitable cement is applied to the coil and allowed to set or harden, after which the core is removed. If more than one layer is found necessary, the second layer is wound over the first and the cement applied to rigidly unite both layers of the successive turns of each layer, so that the coil section constitutes what is in effect a hollow spherical segment that is rigid, durable and self-sustaining, and can be safely manipulated and adjusted without danger of deranging or damaging any of the elements thereof. The second section of the coil 7 is constructed in the same manner on the other ring section 1, thereby completing the stator coil section ready for assembling the two halves.

The rotor coil sections are each constructed in a similar manner and applied to a ring or annulus 8, which is provided with annular shoulders 9 on each edge to receive and support the initial convolutions of each coil section 11, which latter are wound upon collapsible spherical segmental cores, which cores may be readily removed after the coil sections have been completed. The supporting ring 8 of the rotor is of a diameter to fit accurately within the ring sections 1, 1, of the stator, and in order to mount the rotor coil for rotary movement within the stator, the ring 8 is provided with two pintles at diametrically opposite points, which engage the bearings formed by the mating grooves or channels 4, 4, formed in the ring sections 1, 1, when said ring sections are connected or coupled together as shown in Figs. 2 and 3. One of the pintles 10 is preferably made hollow and affords a conduit through which the leads or connecting wires of the rotor coil 11 pass. The other pintle 12 may be made solid to receive a knob 13 which co-operates with the usual dial 14, which indicates the degree of angular adjustment of the respective coils. In order to retain the coils in their properly adjusted positions and prevent accidental end play, a helical spring 15 surrounding the pintle 12 and lying within a recess formed concentrically with the journal bearing in the ring sections 1, 1, bears against the adjacent edge of ring 8 and forces the diametrically opposite edge section thereof into contact with the inner face of the ring sections 1, 1. Obviously, if found necessary, thin shims may be placed between the rotor and stator supporting rings, said shims surounding the pintles and properly spacing the coils.

The connections between the respective coils and the circuit elements of the radio apparatus are those normally employed, and need not be particularly described.

When the device is intended for use as a radio coupler, suitable leads 16 may be taken off from the proper turns or convolutions of the stator coil, as shown in Fig. 4.

From the foregoing description, it will be apparent that a transformer constructed and arranged as specified presents many advantages over the older types, especially in respect of the delicacy of adjustment of the degree of transformation, with a relatively small loss of power or energy due to the transformation, and of the simplicity, lightness and durability of the apparatus.

As thus constructed and arranged, the stator element includes two separable parallel ring sections having diametrically opposite journal bearings formed in their mating faces, each ring section carrying a coil section having the contour of a surface of revolution of the arc of a circle, with the center of the ring as the center of revolution, each coil section being supported by its initial convolutions engaging the corresponding ring section, and being rendered rigid and self-supporting by a suitable adhesive binding medium; and the rotor element comprises a ring or annulus of substantially the same diameter as the interior of the stator ring and journalled for rotary movement in the latter, with two similarly constructed and supported coil sections mounted on the rotor ring so that when the rings are in the same plane, the rotor and stator coils are substantially parallel throughout, separated by a small air-gap, and each has the form of a double truncated spherical shell, that is rigid and self-supporting except for the initial convolutions of the respective coil sections which engage with the shoulders on the corresponding ring sections. After the two sections of the stator element have been completed, and the rotor element has been prepared, the pintles 10 and 12 carried by the latter are engaged with the grooves 4, 4, in one of the ring sections of the stator element, and the other stator section placed in proper position with the two ring sections thereof in parallel engagement and the ring sections 1, 1, connected together by the screws 3. The rotor element is thus mounted within the stator element for free rotation about the axis of the pintles, and when the apparatus is connected to the side wall of the cabinet or other support by means of the bracket 2, and the knob 13 and dial 14 applied, the device is ready for proper connection in the circuits of the radio apparatus. It will be understood, of course, that the coil sections 7, 7, and also the coil sections 11, 11, are properly connected in series, each to form a continuous coil to form the primary and secondary of the transformer.

What I claim is:

1. A transformer for radio systems comprising a stator including a supporting ring having annular shoulders on its opposite faces and coil sections each having the contour of a segmental spherical shell with its initial turns only engaging the shoulder on the corresponding ring face, and all of its turns rigidly united by an adhesive binding medium; and a rotor including a similar ring and coil sections; and means for pivotally connecting the stator within the rotor.

2. A transformer for radio systems comprising a stator including a longitudinally divided ring having an annular shoulder on the outer face of each ring section, a coil section supported by each ring section having its initial turns only engaging the shoulder on the corresponding ring section, each coil section comprising successive convolutions laid up to form a segmental sepherical shell, and rigidly united by an adhesive; a rotor including a ring having annular shoulders on its inner periphery; coil sections similar to the stator coil sections supported by said ring; and means for pivotally connecting the stator within the rotor.

3. A transformer for radio systems comprising a stator element including two parallel ring sections, shell-like coil sections having the contour of a spherical segment with their initial convolutions only engaging said ring sections; a rotor element including a ring having similar shell-like coil sections mounted on each side thereof; and means for pivotally mounting the rotor element within the stator element.

4. A transformer for radio systems comprising a stator element including two parallel ring sections having mating grooves therein to form diametrically opposite journal bearings, coil sections having the contour of a surface of revolution of the arc of a circle supported by their initial convolutions only on the corresponding ring sections and forming as a whole a double truncated spherical shell; a rotor element including a ring, coil sections similar to the stator coil sections carried by the rotor ring and of slightly less diameter than the stator coil; and pintles carried by the rotor ring engaging the journal bearings formed in the stator ring sections.

5. The combination of two relatively movable induction elements, each comprising a relatively narrow supporting ring and a coil having the contour of a segmental spherical shell secured to said ring by its intial turns only and all of its turns rigidly united by a cementitious binding medium; and means for pivotally supporting one of said elements within the other.

In testimony whereof I affix my signature.

ROBERT J. HEITZMAN.